Patented May 16, 1950

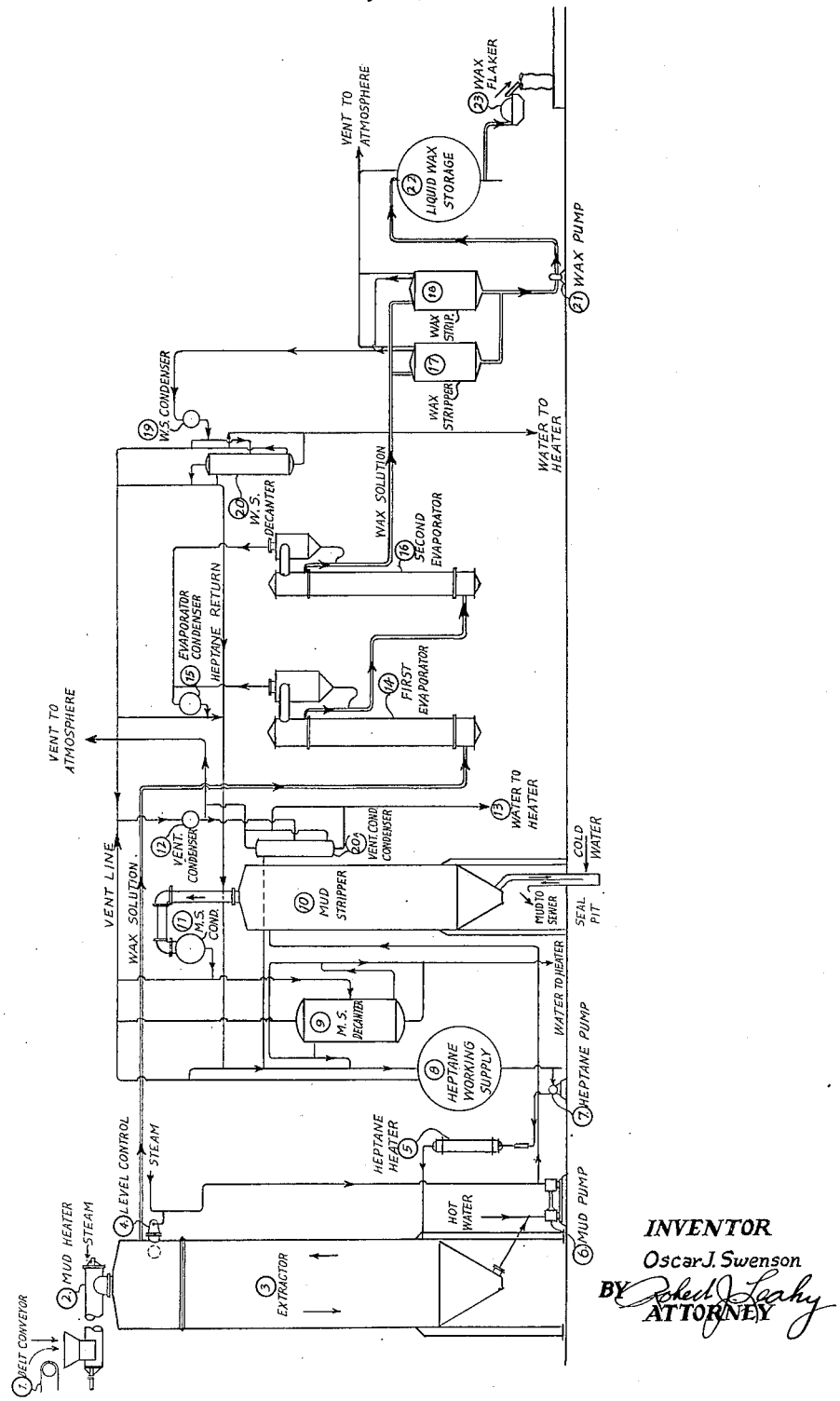

2,508,002

UNITED STATES PATENT OFFICE 2,508,002

METHOD OF EXTRACTING WAX FROM CACHAZA

Oscar J. Swenson, Ithaca, N. Y., assignor to The Cuban-American Sugar Company, New York, N. Y., a corporation of New Jersey, and S. C. Johnson & Son, Inc., Racine, Wis., a corporation of Wisconsin Application May 29, 1947, Serial No. 751,442

6 Claims. (Cl. 260—412.8)

1

This invention relates to a method of extracting wax. More particularly, it relates to a novel process for the extraction of wax from sugar mill filter press cake, more generally known as cachaza.

Cane wax is present on the outer surface of the stalk in all varieties of sugar cane. Various methods for obtaining this wax have been proposed, as by scraping the stalk with a sharp instrument, and by passing the stalks through a bath of water heated sufficiently to melt the wax prior to pressing. Rosales, U. S. Patent No. 2,009,522, suggested drying the cachaza as dry as possible before extracting the wax. However, none of these proposals have proven of economic value.

Cachaza is generally filtered either by means of a plate-and-frame filter, or a rotary vacuum filter, and the sucrose content recovered. Generally, a filter aid such as bagacillo or fine bagasse is used with the rotary vacuum filter which results in a more porous filter cake from which the sucrose content may be more efficiently removed.

The previous history of commercial cane wax extraction has been that interest revives during wartime when well-known waxes become scarce, but dies down when the other waxes become available. I have recently been making commercial experiments in extracting cane wax using a horizontal type extractor. In this type of extractor solvent flows horizontally over the cachaza in an unbroken stream with ample opportunity to by-pass it, and all contact between the solvent and the interior of the cachaza must be effected by the mixing action of the agitator paddles which are rendered less effective by the tendency of relatively heavy cachaza to settle out of the solvent. My experiments have shown that this type of extractor does not accomplish the intimate mixing of the cachaza with the solvent essential to obtain the yields of wax necessary to make the extraction process economically sound.

I have, therefore, developed a new and novel process for extracting wax using a vertical type of extractor wherein cachaza in a fluid state is intimately contacted with a water-immiscible organic solvent, and the wax removed from the cachaza. My invention, therefore, broadly stated is a method of extracting wax from cachaza comprising flowing fluid cachaza downward, with sufficient agitation to maintain said cachaza in a fluid state through a wax-extracting zone maintained at wax-extracting

2 temperature, and traveling countercurrent to an upward moving water-immiscible solvent, continuously removing the wax-enriched solvent from the wax-extracting zone, evaporating the solvent and removing the wax, while continuously removing the extracted cachaza from the wax-extracting zone, and flowing the extracted cachaza downward, with agitation, through a solvent removing zone at a temperature sufficient to vaporize the solvent present in the extracted cachaza.

The invention will be understood by reference to the following description taken in connection with the accompanying flow diagram in which is shown a schematic illustration of apparatus suitable for carrying out the process of the present invention.

Referring more specifically to the drawing, a belt conveyor 1 carries solid cachaza from either a plate-and-frame filter press or a rotary vacuum filter and discharges it into a mud heater 2. The mud heater 2 consists of a horizontal paddle-type conveyor operating inside of a cylindrical pipe. Hot water is introduced at the point of entry of the cachaza, and open steam is admitted at several points along the body of the heater. The amount of hot water, together with the condensate from the steam, is regulated so as to be sufficient to change the solid cachaza to a fluid state. The mud heater 2 discharges directly into an extractor 3.

The extractor 3 is a vertical type extractor consisting essentially of a cylindrical body mounted vertically and containing a series of perforated horizontal plates. The plates are equipped with openings to furnish a passage for the cachaza or mud downward, and are arranged alternately at the outside and at the center of successive plates. The passage of mud is, therefore, from the edge of the plate to the center and then downward to the plate below, radially across this plate to its edge and then downward to the next lower plate and repeating this cycle. To cause the mud to behave as a fluid and insure its flow, an agitator is provided on each plate. A vertical shaft passes through the center line of the cylindrical vessel and a plurality of horizontal arms carrying a number of small fingers are attached to it immediately above each plate to agitate the mud on each plate. Hot solvent, preferably heptane because of its low cost and availability, is pumped from a heptane working supply tank 8 by means of a heptane pump 7 to a heptane heater 5, and introduced when hot into the base of the extractor 3. Being of lower density than the cachaza, the heptane passes upward successively through the perforations in each plate and the layer of cachaza above each plate. The cachaza descends through the passageway as the continuous phase and acts as a piston at each plate to force the heptane upward through the perforations, the heptane being the discontinuous phase. As the heptane issues through the perforations on any particular plate, it is met by the agitator arms and thoroughly mixed with the cachaza which is flowing radially across the plate, thereby providing good contact for effecting the extraction of the crude wax. The heptane carrying the extracted wax in solution overflows from the top of the extractor 3, to be evaporated for recovery of its crude wax content as product.

The extracted cachaza is removed from the base of the extractor 3 by a mud pump 6. The level of cachaza or mud in the top of the extractor 3 will be determined by the rate at which the pump 6 operates. To automatically control this level, an interface float controller or level control 4 is provided in the top section of the extractor 3, which, in turn, controls the mud pump 6. Hot water is added at the entry of the mud pump 6 to the extracted cachaza to prepare it for removal of the heptane in the mud stripper 10.

The extracted cachaza or mud is then pumped to the mud stripper 10. This unit is mounted vertically similar to the extractor 3, and consists of a vertical cylindrical shell containing a series of perforated plates. These plates are equipped with passageways located alternately at the edge and the center of the successive plates. The plates carry an overflow weir to maintain a fixed level of mud on each plate as it passes downward through the unit. In addition, splash guards are provided to prevent sufficient mud from splashing over the weir, as a result of agitation, to break the vapor seal between plates. To maintain the mud in a fluid condition, an agitator similar to that used in the extractor is provided. Each plate thus has an agitator operating in the mud layer immediately above it, the agitator being connected to a vertical shaft passing through the center line of the vertical cylindrical vessel.

The heptane is stripped from the mud by contacting it with live steam. The spent mud leaving the stripper is passed directly to the sewer. The heptane removed from the mud leaves the top of the mud stripper 10 together with the steam and enters a condenser 11 wherein the vapors are condensed and pass to a decanter 9 wherein the heptane is separated from the water and returned to the heptane working supply 8 and the water is returned to the heater.

The solution of crude wax in heptane overflows the top section of the extractor 3 and passes into the first evaporator 14. This evaporator may be a long-tube type or calandria type. The bulk of the heptane is removed in this stage, and the solution from the first evaporator 14 passes into the second evaporator 16 for further concentration. Centrifugal separators are provided in the vapor lines of the evaporators to minimize the possibility of any foam or entrained liquid passing to the condenser. The vapors from the first evaporator 14 and the second evaporator 16 are condensed in an evaporator condenser 15, and the heptane recovered, returned to the heptane working supply 8.

The product from the second evaporator 16 passes to wax strippers 17 and 18. These strippers are agitated jacketed vessels into which super-heated steam is introduced through a perforated ring below the surface of the wax solution. Steam in the jacket space provides the heat required to vaporize the heptane remaining in the solution and the superheated steam acts as a carrier for the heptane vapor and reduces the final content of heptane in the wax to a minimum. The heptane-steam vapors are condensed in condenser 19 and separated in decanter 20. The water is passed to the heater while the heptane is returned to the heptane working supply 8.

The wax product from the wax strippers 17 and 18 is pumped by means of a wax pump 21 to a liquid wax storage tank 22. This vessel serves both as a storage tank and as a blender to equalize small differences in composition of the crude product. The molten wax then passes from the liquid wax storage 22 to a wax flaker 23.

This wax flaker 23 consists of a chilled drum which dips into a vat into which the molten wax is fed. A thin coat of solidified wax is picked up on the drum and is removed by a doctor blade to produce the desired flakes which are then conveyed directly into a bag for storage or shipping.

While I have described a preferred arrangement of apparatus for carrying out my invention, it will be understood that various changes and modifications may be made without departing from the spirit of my invention. For example, the number of evaporators 17 and 18 may be varied, and the wax flaker 23 may be entirely eliminated, if desired.

The operating conditions will vary over a wide range. Preferably, however, the moisture content of the solid cachaza as it passes over the conveyor 1, will be about 80%, and will ordinarily contain bagacillo applied as a filter aid prior to filtering with a rotary vacuum filter. The temperature of the solid cachaza as it enters the mud heater 2 will be about 100° F. and is raised to about 175° F. while sufficient water is added to change the solid cachaza to a fluid state. The fluid cachaza, as it enters the extractor 3, is preferably around 175° F., the approximate mutual boiling point of water and heptane at atmospheric pressure. Heptane enters the bottom of the extractor 3 at about 230° F. and heats the mud as it rises. It will be understood that extraction temperatures will vary in accordance with the solvent used and the desired operating conditions. Generally, however, the temperature at which extraction may be carried out is upward of 100° F., and that temperature, which is the boiling point of the mixture of solvent and cachaza of proper water content at the pressure under which the cachaza is extracted, may be considered as the maximum.

The operating temperatures of the mud stripper, evaporators and wax strippers must be sufficient to vaporize the solvent. This will vary with the solvent selected.

The ratio of solvent to dry material may be from 0.5 pound to 20 pounds, and is preferably from 2 to 8 pounds of solvent per pound of dry material employed.

While heptane has been used in the description as the solvent for the wax, the invention is not so limited. Various water-immiscible organic solvents, as hydrocarbons, more particularly aliphatic hydrocarbons, and especially a liquid petroleum fraction distilling completely at a temperature of about 230° F. may be used. In addition, other solvents may be used such as benzene, toluene, xylenes, hexanes, heptanes, octanes, nonanes, singly or in admixtures, saturated cyclic hydrocarbons, as cyclohexane, and chlorinated hydrocarbons, as for example, butyl chloride and amyl chloride. Other solvents may be used, such as, lower alkyl acetates and propionates having from 1 to 5 carbon atoms, such as, methyl, ethyl, propyl, butyl and amyl derivatives. In choosing a solvent for the wax, not only should the solvent power for wax be considered, but availability, cost and the like should be considered.

While I have disclosed several novel methods and/or apparatus which I have not specifically claimed herein, attention is directed to the following related application which I am filing simultaneously with this application in which I am claiming these inventions as follows:

I have specifically claimed the method of extracting wax through a vertical extractor and the apparatus therefor in my application S. N. 751,441, filed May 29, 1947, which has now become abandoned, in the United States Patent Office.

I have specifically claimed the method and apparatus for mixing and heating solid cachaza prior to its introduction into the extractor in my application S. N. 751,440, filed May 29, 1947, in the United States Patent Office.

I have specifically claimed the method and apparatus for stripping solvent from the extracted cachaza in my application S. N. 751,439, filed May 29, 1947, in the United States Patent Office.

Other modes of applying the principle of the invention may be employed instead of those explained, change being made as regards the method herein disclosed, provided the step or steps stated by any of the following claims or the equivalent of such stated step or steps be employed.

I claim:

1. A method of extracting wax from cachaza comprising flowing the heated fluid cachaza downwardly through a wax-extracting zone, passing a countercurrent flow of heated water-immiscible organic solvent through said wax-extracting zone, agitating the fluid cachaza while passing it countercurrent through said wax-extracting zone in intimate admixture therewith, continuously removing wax-enriched solvent from a high point in the wax-extracting zone, continuously removing the extracted cachaza from a low point in the wax-extracting zone while still in a fluid state, recovering the solvent from the wax-enriched solvent to recover the wax, recovering the solvent from the extracted cachaza and returning the recovered solvent to the system.

2. A method of extracting wax from cachaza comprising flowing the heated fluid cachaza downwardly through a wax-extracting zone, passing a countercurrent flow of heated heptane through said wax-extracting zone, agitating the fluid cachaza while passing it countercurrent through said wax-extracting zone in intimate admixture therewith, continuously removing wax-enriched heptane from a high point in the wax-extracting zone, continuously removing the extracted cachaza from a low point in the wax-extracting zone while still in a fluid state, recovering the heptane from the wax-enriched heptane to recover the wax, recovering the heptane from the extracted cachaza and returning the recovered heptane to the system.

3. A method of extracting wax from cachaza comprising flowing the heated fluid cachaza downwardly through a wax-extracting zone, passing a countercurrent flow of heated water-immiscible organic solvent through said wax-extracting zone, agitating the fluid cachaza while passing it countercurrent through said wax-extracted zone in intimate admixture therewith, continuously removing wax-enriched solvent from a high point in the wax-extracting zone, continuously removing the extracted cachaza from a low point in the wax-extracting zone while still in a fluid state, recovering the solvent from the wax-enriched solvent to recover the wax by evaporating said solvent through a plurality of evaporating zones, recovering the solvent from the extracted cachaza by flowing said fluid extracted cachaza downward through a solvent-removing zone, passing a countercurrent flow of steam through said solvent-removing zone, agitating the fluid extracted cachaza while passing it countercurrent through said solvent-removing zone in intimate admixture therewith, and returning the recovered solvent to the system.

4. A method of extracting wax from cachaza comprising flowing the heated fluid cachaza downwardly through a wax-extracting zone, passing a countercurrent flow of heated heptane through said wax-extracting zone, agitating the fluid cachaza while passing it countercurrent through said wax-extracted zone in intimate admixture therewith, continuously removing wax-enriched heptane from a high point in the wax-extracting zone, continuously removing the extracted cachaza from a low point in the wax-extracting zone while still in a fluid state, recovering the heptane from the wax-enriched heptane to recover the wax by evaporating said heptane through a plurality of evaporating zones, recovering the heptane from the extracted cachaza by flowing said fluid extracted cachaza downward through a heptane-removing zone, passing a countercurrent flow of steam through said heptane-removing zone, agitating the fluid extracted cachaza while passing it countercurrent through said heptane-removing zone in intimate admixture therewith, and returning the recovered heptane to the system.

5. A method of extracting wax from cachaza comprising flowing the heated fluid cachaza downwardly through a wax-extracting zone, passing a countercurrent flow of heated water-immiscible organic solvent through said wax-extracting zone, agitating the fluid cachaza while passing it countercurrent through said wax-extracting zone in intimate admixture therewith, continuously removing wax-enriched solvent from a high point in the wax-extracting zone, continuously removing the extracted cachaza from a low point in the wax-extracting zone while still in a fluid state, recovering the solvent from the wax-enriched solvent to recover the wax, recovering molten wax and solidifying said wax, recovering the solvent from the extracted cachaza and returning the recovered solvent to the system.

6. A method of extracting wax from cachaza comprising flowing the heated fluid cachaza downwardly through a wax-extracting zone, passing a countercurrent flow of heated heptane through said wax-extracting zone, agitating the fluid cachaza while passing it countercurrent through said wax-extracting zone in intimate admixture therewith, continuously removing wax-enriched heptane from a high point in the wax-extracting zone, continuously removing the extracted cachaza from a low point in the wax-extracting zone while still in a fluid state, recovering the heptane from the wax-enriched heptane to recover the wax, recovering molten wax and solidifying said wax, recovering the heptane from the extracted cachaza and returning the recovered heptane to the system.

OSCAR J. SWENSON.

REFERENCES CITED

The following references are of record in the file of this patent:

UNITED STATES PATENTS

| Number | Name | Date |
|---|---|---|
| 2,428,813 | Rhodes et al. | Oct. 14, 1947 |

Certificate of Correction

Patent No. 2,508,002

May 16, 1950

OSCAR J. SWENSON

It is hereby certified that error appears in the printed specification of the above numbered patent requiring correction as follows:

Column 5, lines 23 and 24, strike out ", which has now become abandoned,"; and that the said Letters Patent should be read with this correction therein that the same may conform to the record of the case in the Patent Office.

Signed and sealed this 5th day of September, A. D. 1950.

[SEAL]

THOMAS F. MURPHY,
*Assistant Commissioner of Patents.*